Dec. 6, 1932.  H. A. GEHRES  1,890,051

VALVE MECHANISM

Filed March 25, 1930  2 Sheets-Sheet 1

INVENTOR
Hewitt A. Gehres
BY Neal, Crosby & Neal
his ATTORNEYS

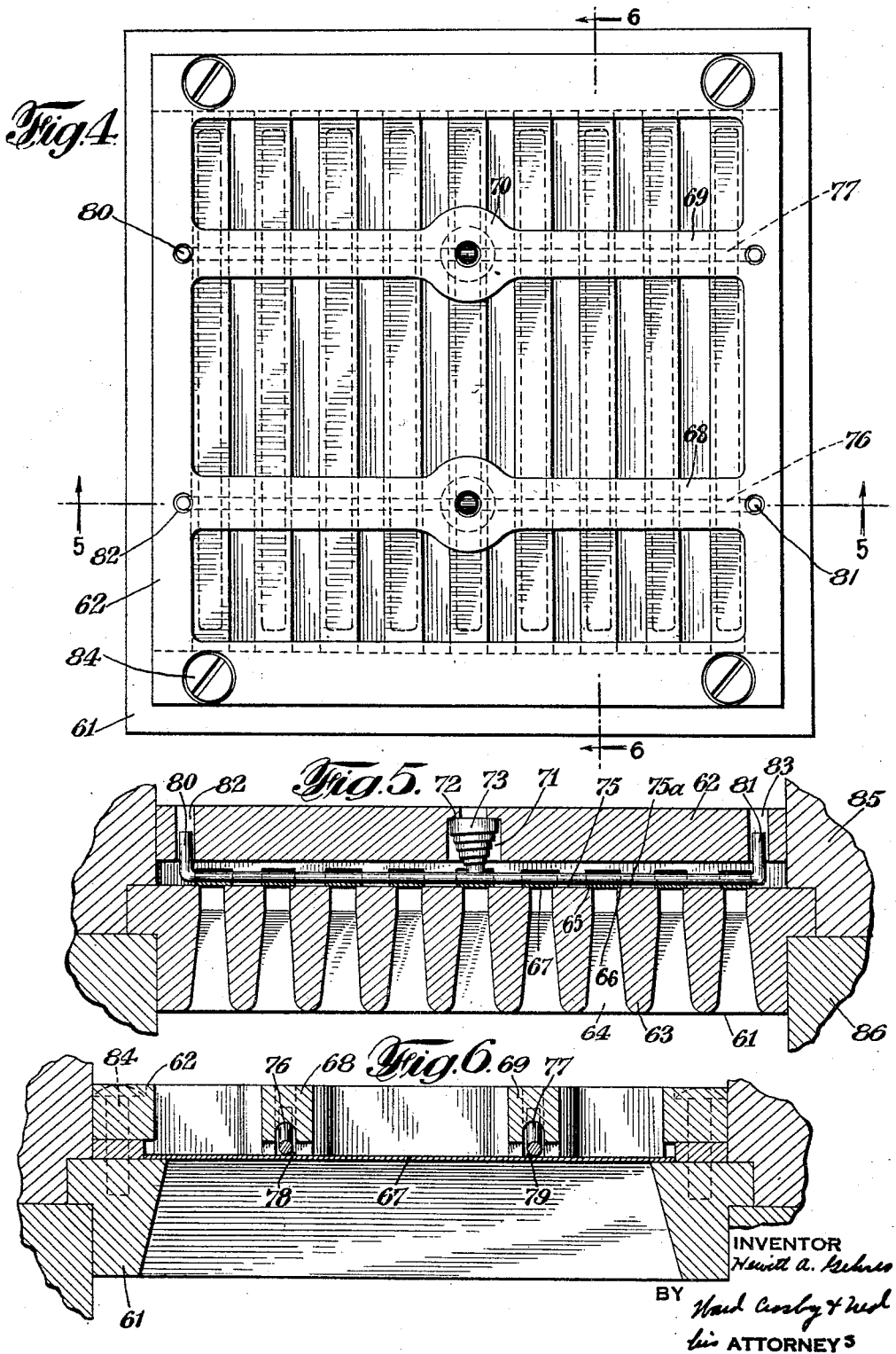

Patented Dec. 6, 1932

1,890,051

UNITED STATES PATENT OFFICE

HEWITT A. GEHRES, OF MOUNT VERNON, OHIO, ASSIGNOR TO COOPER-BESSEMER CORPORATION, OF MOUNT VERNON, OHIO, A CORPORATION OF OHIO

VALVE MECHANISM

Application filed March 25, 1930. Serial No. 438,674.

This invention relates to valve mechanism. The invention is particularly applicable to air valves or the like, and has been found to be specifically advantageous in its adaptation to compressor valve structures.

An object of the invention is to provide a valve in which plates are utilized to close the valve openings and in which the plates are provided with uniform spring pressure having the advantage of distributing the spring pressure to the valve plates substantially uniformly per unit of valve plate area of pressure distribution.

Another object of the invention is to provide a structure in which the valve plates are free from undue and localized wearing.

The invention consists in the novel features, arrangements and combination of parts embodied by way of example in the apparatus hereinafter described, as illustrating preferred forms of the invention, and the invention will be more particularly pointed out in the appended claims.

Figure 2:
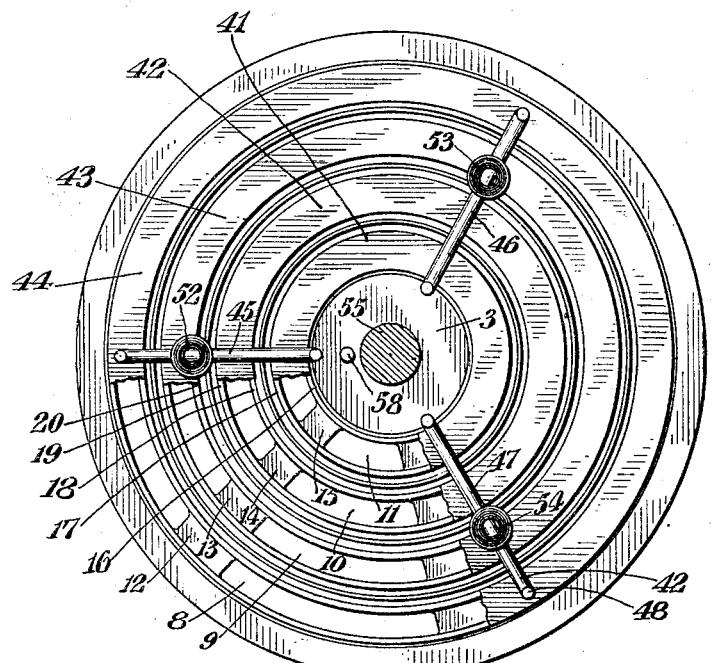
Figure 1:
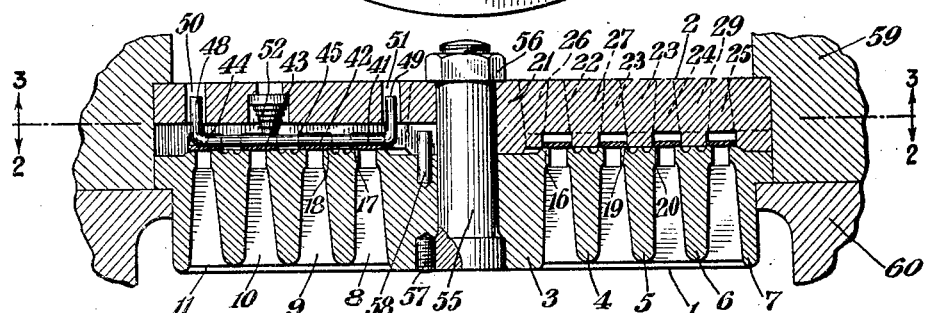
Figure 3:
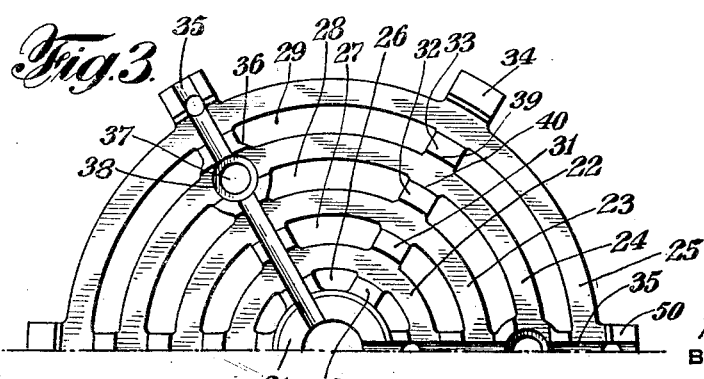

Other objects, features and advantages will appear from the following specification and claims taken in connection with the accompanying drawings, in which Fig. 1 is a transverse section of the valve in side elevaton, taken on the diameter of the valve, Fig. 2 shows the valve in plan viewed as indicated at 2—2 in Fig. 1, with the top frame member removed, and with certain parts broken away to more clearly illustrate certain features, Fig. 3 is a segmental plan of the upper frame member viewed as indicated at 3—3 in Fig. 1, Fig. 4 is a plan view of a valve structure showing a modification, Fig. 5 is a section taken in elevation at 5—5 of Fig. 4, and Fig. 6 is a section at 6—6 of Fig. 4.

Referring to the drawings and more particularly to Figs. 1-3, inclusive: the invention will be first described with reference to a preferred form thereof as illustrative of the invention, and in which form the valve is of general circular configuration.

The valve seat frame member is designated as 1 and the valve guard frame member is designated as 2, these two frame members providing the supporting and restraining structure for the associated valve parts. In the present embodiment the frame 1 is the suction side of the valve and the frame 2 is the discharge side of the valve. The members 1 and 2 will now be individually described.

The valve seat 1 is provided with a hub portion 3 and concentrically spaced ribs 4, 5, 6 and 7 spaced apart to form the inlet openings 8, 9, 10 and 11; and providing in effect a grid structure. The ribs 4, 5, 6 and 7 are interconnected by means of a plurality of webs angularly disposed about the hub 3 and each comprising a series of web portions 12, 13, 14 and 15. The ribs 4, 5, 6 and 7 adjacent their upper faces are provided with ground valve seats 16, 17, 18, 19, 20, etc., the seats being adjacent the inlet openings; the seats 16 and 17 for example being associated with the inlet opening 8, and the seats 18 and 19 being associated with the inlet opening 9, and so on.

The valve guide frame 2 is provided with a hub portion 21 and concentrically spaced ribs 22, 23, 24 and 25 spaced apart from the hub and from each other to provide therebetween concentric discharge openings 26, 27, 28 and 29; and providing in effect a grid structure. The ribs 22-25, inclusive, are spaced apart by a plurality of webs angularly disposed about the hub axis and each comprising a series of web portions 30, 31, 32 and 33. These web portions extend downwardly beyond the lower face of the ribs (Fig. 1) so as to abut the respectively corresponding ribs 4, 5, etc. of the frame 1, and an axially outwardly extending web projection 34. Alternate webs are provided with grooves 35 extending radially from the central bore of the hub outwardly through the projections 34. Also one of the ribs such as rib 24 is provided, at its juncture with the said alternate webs, with an enlarged portion or boss 36 having a countersunk bore 37 providing a seat 38 therein.

The hubs, concentric ribs, and openings in the respective members 1 and 2 are so disposed and positioned that the downwardly projecting web portions such as 31, 32, etc. will lie against the corresponding ribs 4, 5, etc., and the inlet openings 8, 9, etc. will lie in staggered relation with respect to and between outlet openings 26, 27, etc. It will also be noted with particular reference to Figs. 1 and 3 that the various web portions of increased depth have their respectively adjacent faces such as 39 and 40 so positioned and formed as to serve as guides for the respective valve plates, as will be more fully described following.

With reference to Fig. 1: The valve plates are designated as 41, 42, 43 and 44, and in the present embodiment are in the form of independent rings of substantially the same width, but of different diameters. These concentric valve plate rings are guided between the respective guiding faces such for example as 39 and 40, by which they are held in proper lateral alignment with respect to the valve seats such as 16 and 17, etc. and over the inlet valve openings such as 8, 9, etc. The valve plates are normally yieldably held in closed position by means of the holding members 45, 46 and 47, each of which is provided with guiding ends such for example as 48 and 49 seated in respectively corresponding bores such as 50 and 51 formed in the frame member 2. The holding members 45, 46 and 47 are urged against the valve plates by means of springs respectively designated as 52, 53 and 54; the springs being seated in the respective bores designated in Fig. 3 as 37 and being seated against the respective seats, designated as 38.

It is to be particularly noted that the springs 52, 53 and 54 are positioned outwardly from the center of the valve in such position that they coincide with substantially the center of area of the total of the valve plate areas. In other words, the valve plate ring 41 and each succeeding outwardly spaced ring has an effective area less than any of the valve rings which are respectively outwardly spaced therefrom; and therefore in the present embodiment of the invention the springs 52, 53 and 54 are positioned radially outwardly from the center of the valve so as to lie on a circle whose diameter is greater than the median diameter between the diameter of the smaller ring and the diameter of the larger ring. It will therefore be seen that the spring means yieldably urges said plates in closed position in proportion to their respective pressure distribution. In other words, the springs are so located as to exert their force at the center of pressure of the plurality of valve plates 41, 42, 43 and 44. This is of very great importance in structures of this character, since it balances the movement of the plates and prevents their tilting and furthermore provides a yieldable holding means which moves up and down with the plates without having any appreciable relative transverse movement with respect thereto; such relative transverse movement as it will be readily appreciated by those skilled in the art causes undue wearing or abrasion of the plates which is highly undesirable, and which necessitates replacements of the parts.

The valve seat member 1 and the valve guide member 2 are firmly held together by suitable means such for example as the spindle bolt 55 and the nut 56, and in the present embodiment the spindle bolt is held against angular displacement in the member 1 by means of the set screw 57. Dowel pin 58 is utilized for positioning the frame members 1 and 2 in proper angular position.

The valve mechanism is held in its cooperating structure in any suitable manner such for example as by being positioned between respectively corresponding parts 59 and 60, it being understood that the members 59 and 60 per se are respresentative merely of a suitable structure for holding the valve in its operative position.

Operation

In the operation of the valve the fluid enters the inlet openings 8, 9, 10 and 11, and when the fluid pressure is of sufficient magnitude the valve plates 41, 42, 43 and 44 move upwardly carrying the valve holders 45, 46 and 47 against the pressure of the springs 52, 53 and 54, and the fluid thereupon passes outward through the outlet openings 26, 27, 28 and 29. Since the springs are positioned so as to exert a pressure on each valve plate in direct proportion to the valve area or pressure distribution, the plates will all move upwardly simultaneously, and hence in such perfect alignment as to prevent any chafing, and in a manner providing a uniform and efficient valve opening. During this movement of the valve plates as above described, they are guided vertically between the guide surfaces such for example as 39 and 40, against the holders 45, 46 and 47 which move substantially vertically, being guided in their respective guideways such for example as indicated in Fig. 1 as 51 and 52; without any relative transverse movement between the plates and the holding members and as heretofore pointed out without any chafing action of the valve plates.

Modification

In Figs. 4, 5 and 6 a modification is illustrated in which the valve is rectangular in plan view. Since the essential elements of this modification are similar to those of the circular valve hertofore described, only the general features thereof will be described following.

The valve seat member is designated as 61 and the valve guide as 62. The member 61 is constructed with ribs 63 spaced apart to provide inlet openings therebetween designated as 64. Suitable seats such as 65 and 66 are formed on the upper edges of the ribs 63 to provide a valve seat for each of the valve plates 67. In a valve of this geometric shape the ribs 63 and spaces 64 form in effect a rectangular grid; and the valve plates 67 are spaced apart and extend in parallel relation in such manner as to close the inlet openings.

The valve guide frame 62 is provided with the transversely extending webs 68 and 69. Each of the webs such as 68 and 69 is provided with a centrally disposed enlarged boss 70 provided with a bore 71 and a seat 72 for accommodating the valve springs 73. Furthermore, each of the webs is provided with downwardly extending projections 75 between which are formed guideways for the respective valve plates 67, to restrict them against lateral movement in their opening and closing movements. The holding members 76 and 77 are seated in grooves 78 and 79 formed in the webs 68 and 69 and are each provided with upwardly extending ends 80 and 81 disposed in bores 82 and 83.

The valve frame members 61 and 62 are rigidly held in proper position by suitable means such for example as the machine screws designated as 84. The valve in its assembled condition is supported by a suitable part of the corresponding device for which it is adapted to be used such for example as being held between the members 85 and 86 which are illustrated in suitable supporting holding means.

Since the various valve plates in this embodiment are of respectively equal area, and correspondingly subjected to equal pressure distribution, the springs 73 are positioned on the median line of the valve to thereby exert a force on the valve plates according to the uniform pressure distribution thereagainst by the fluid. Since the action of the corresponding members of the modified valve structure are similar to those of the corresponding parts of the circular valve heretofore described, a repetition of the operation of the valve is not deemed necessary.

Having thus described my invention with particularity with reference to its preferred forms, it will be obvious to those skilled in the art, after understanding my invention, that other changes and modifications may be made therein without departing from the spirit and scope of my invention and I aim in the appended claims to cover such changes and modifications as are within the scope of the invention.

What I claim is:

1. A compressor plate valve having frame means providing a plurality of valve openings and adjacent seats lying substantially in the same plane, a plurality of relatively thin valve plates engageable with said seats to close said openings, a common valve-holding member overlying and bearing against said plates, said member being in the form of an elongated rod extending transversely of the path of movement of the plates and restricted to a path of movement substantially parallel to the movement of said plates, and means urging said member to yieldably hold said plates in closed position.

2. A compressor plate valve having frame means for providing a plurality of valve openings and adjacent seats, a plurality of valve plates engageable with said seats to close said openings, a plurality of independent valve holding members arranged in spaced relation and each common to and overlying a plurality of said plates, and individual means urging each of said members individually to yieldably hold said plates in closed position.

3. A compressor plate valve having frame means providing a plurality of concentrically disposed annularly arranged valve openings and adjacent seats, a plurality of valve ring plates engageable with said seats to close said openings, a plurality of independent valve holding members each common to and overlying a plurality of said ring plates and extending radially thereof, and individual means respectively urging each of said members to yieldably hold said plates in closed position.

4. A compressor plate valve having frame means providing a plurality of valve openings and adjacent seats, a plurality of valve plates of unequal pressure areas engageable with said seats to close said openings, a plurality of independent valve holding members each common to and overlying a plurality of said plates, and individual means respectively urging said members to yieldably hold said plates in closed position, said means being applied to said members in such manner as to exert a force upon each of said plates substantially in proportion to the respective pressure areas of said plates.

5. In valve mechanism of the character described the combination of, a supporting frame, a cooperating frame secured thereto, one of said frames being provided with a plurality of valve seats and adjacent valve inlet openings, a plurality of plate valves normally seated on said seats to close said openings, means for resiliently holding said plates in normal position, said means comprising a rigid holding member positioned between said frames for movement toward and away from said seats and overlying said plates, and spring means acting upon said rigid member to urge said rigid member toward said seats to thereby urge said plates simultaneously toward their respective seats, the other of said frames being so constructed and positioned with respect to said first frame as to provide outlet openings in communication with said inlet openings when said plates are moved away from their seats against the action of said resilient holding means.

6. A compressor plate valve having frame means providing a series of valve openings and adjacent seats lying substantially in the same plane, a series of relatively thin valve plates engageable with said seats to close said openings, a second frame means between which and said first frame means said valve plates are positioned, said second frame means lying closely adjacent to said first frame means and being provided with openings cooperating with the said valve openings, a longitudinal valve holding member extending transversely of said series of plates and overlying said plates, and resilient means for urging said member to yieldably hold said series of plates in closed position, said valve holding member and said resilient means being interposed between said valve plates and said second frame means.

In testimony whereof I have signed my name to this specification.

HEWITT A. GEHRES.